US005642921A

United States Patent [19]
Webb et al.

[11] Patent Number: 5,642,921
[45] Date of Patent: Jul. 1, 1997

[54] ADJUSTABLE HEIGHT STUD FOR USE IN A SNOWMOBILE TRACK

[76] Inventors: Edward H. Webb, 17003 County Rd. 181, Paynesville, Stearns County, Minn. 56362; Allan H. Remmel, Box 183—408 Sunrise La., Grove City, Stearns County, Minn. 56243; Darwin L. Miller, 6513 82nd Ave. Northeast, Spicer, Stearns County, Minn. 56288

[21] Appl. No.: 545,350

[22] Filed: Oct. 19, 1995

[51] Int. Cl.[6] .................................................. B62D 55/26
[52] U.S. Cl. ........................ 305/179; 305/180; 305/161
[58] Field of Search ................................ 305/160, 161, 305/162, 167, 178, 179, 180, 35 R, 35 EB, 38, 39, 54; 301/46, 50

[56] References Cited

U.S. PATENT DOCUMENTS

| 2,426,974 | 9/1947 | Ragon | 305/35 |
|---|---|---|---|
| 3,572,851 | 3/1971 | Schuler | 305/35 |
| 3,767,275 | 10/1973 | Russ, Sr. | 305/38 |
| 3,779,617 | 12/1973 | Palmaer | 305/167 X |
| 3,782,787 | 1/1974 | Rubel et al. | 305/35 |
| 3,785,420 | 1/1974 | Bradley et al. | 151/37 |
| 3,838,894 | 10/1974 | Reedy | 305/35 |
| 3,865,441 | 2/1975 | Joliffe | 305/54 |
| 3,930,689 | 1/1976 | Maki | 305/35 |
| 3,973,808 | 8/1976 | Janssen et al. | 305/54 |
| 4,059,315 | 11/1977 | Joliffe et al. | 305/35 |
| 4,095,849 | 6/1978 | Husted | 305/35 |
| 4,218,101 | 8/1980 | Thompson | 305/35 |
| 4,261,622 | 4/1981 | Miller | 301/46 X |
| 4,758,055 | 7/1988 | Anderson | 305/165 X |
| 5,234,266 | 8/1993 | Musselman et al. | 305/54 |
| 5,299,860 | 4/1994 | Anderson | 305/180 |

*Primary Examiner*—Russell D. Stormer
*Attorney, Agent, or Firm*—David George Johnson

[57] ABSTRACT

A snowmobile stud (12) having a tip (18) which permits adjustment of the degree of protrusion of the tip beyond the bottom surface (10) of the track (1). The stud (12) can be installed with the aid of a nut (20) placed within an oversized bore (19). Alternatively, the stud (12) can be mounted within an undersized bore (27) without the use of a nut. In either method, an undersized hole is drilled in the existing laterally extending track stiffening bar (7), the hole being enlarged and self tapped by the advancement of the stud (12). The stud (12) may be fully retracted for use on snow or extended to the desired extent for use on ice.

3 Claims, 7 Drawing Sheets

ADJUSTABLE HEIGHT STUD FOR USE IN A SNOWMOBILE TRACK

1. FIELD OF THE INVENTION

This invention relates generally to traction elements for use with a vehicle having an endless, flexible track. More specifically, the present invention relates to an ice or turf gripping stud having a pointed projection which can be adjustably varied in its distance from the surface of the flexible track.

2. BACKGROUND OF THE INVENTION

Most vehicles traveling over naturally occurring terrain use some sort of flexible medium to actually contact the ground. This is essential in order to accommodate the various obstacles and irregularities of the earth's surface, as well as to provide some degree of shock absorption to the rest of the vehicle. Unfortunately, the flexible medium, usually a rubber like material, does not offer sufficient traction with many types of surfaces. In order to improve the grip of the track or tire with particularly slippery or smooth surfaces, pointed projections, commonly referred to as studs, are mounted in some fashion on the flexible ground engaging material.

An early example of such a stud is shown in U.S. Pat. No. 2,426,974, issued to Ragon. Ragon utilizes a fixed length projection or "calk" which is mounted to the surface of an interior layer of a tire, permitting the calk to project through the outermost layer of the tire and engage the ground.

An early snowmobile stud is shown in U.S. Pat. No. 3,572,851, issued to Schuler, discloses a laterally mounted cleat to which fixed length studs are rigidly mounted. The studs are formed as four sided projections with an open interior region through which the mounting hardware passes.

In an effort to provide an integrally formed track stud, U.S. Pat. No. 3,767,275, issued to Russ, discloses an imbedded member which resides in a raised area of the track. Once the individual fixed length studs wear or become damaged in use, the entire track must be replaced.

The traction device state of the art has evolved toward individual traction elements placed on the snowmobile track by the end user. Studs of this type are shown in U.S. Pat. No. 3,782,787, issued to Rubel et al, which utilizes pairs of fixed length studs mounted oil a common, track engaging base.

An individual after market stud is shown in U.S. Pat. No. 3,785,420, issued to Bradley et al. The ground engaging element is a pronged cleat that abuts the outer surface of the track and projects a fixed distance therefrom. Similar types of ice engaging cleats are shown in U.S. Pat. Nos. 3,930,689, 3,973,808, 4,049,315 and 3,865,441.

Single, discrete pointed and blunt nosed fixed length studs proliferate in the endless track state of the art. Examples of such studs are shown in U.S. Pat. Nos. 3,838,894 and 5,234,266. The effectiveness of these studs is hampered by the fact that they are mounted in the flexible, nonreinforced region of the track. When the stud is forced into the ice or earth due to the weight of the snowmobile, the resilient track is free to recoil or deflect upwardly in the region of the stud, thus reducing the degree of ice penetration achieved by the stud.

While all of the aforementioned studs are both fixed length and rigid, some attempts have been made to address the problem of stud length which, ideally, must vary according to the specific type of terrain encountered, the amount of stud wear which has already occurred and the vehicle speed and weight. One proposed solution has been to make a stud of a flexible material as shown in U.S. Pat. No. 4,095,849, issued to Husted. Another proposed solution has been to affix the stud to a resilient or deformable mount, as shown in U.S. Pat. No. 4,218,101.

However, none of the studs and stud mounting arrangements previously devised has addresses the underlying problem of having a fixed length stud which has a length which may be readily adjusted by the end user on a daily basis. The traction advantages of a fixed length stud are many, but heretofore alteration in the length of such a stud could only be accomplished by replacing the stud itself, which is a time consuming process.

SUMMARY OF THE INVENTION

The present invention addresses many of the shortcomings of the prior art by combining the advantages of a fixed length stud with the heretofore unknown capability of adjusting the length of such a stud by means of readily available hand tools. The present invention includes a threaded shaft typically formed of mild steel or other strong, rigid materials. The tip of the shaft is formed as a pick having an approximately thirty degree taper, suitable for engaging materials such as ice. Within the head of the shaft is formed an indentation, suitable for engagement by a hexagonal allen wrench, phillips head tool, slotted tool or other gripping device.

Formed laterally within the typical flexible snowmobile track are spaced apart stiffeners, or "bars", which give the track the rigidity needed in its operating environment. The placement of the bars is such that they correspond either to spaced apart ridges formed on both the inner and outer surfaces of the track, or to the flat regions existing between the ridges. The ridges on the inner surface of the track exist in order to engage the driving mechanism of the snowmobile, and hence move the track along its endless path. The ridges on the outer surface of the track are intended to engage the snow covered earth's surface. The combination of these raised areas along with the presence of the stiffening bar creates a reinforced area in the track through which the shaft of the present invention may be mounted.

The threaded shaft of the present invention is mounted such that the pointed, or "pick", end of the shaft protrudes beyond the outer surface of the track. The distance of protrusion is controlled by the number of rotations of the threaded shaft. In one embodiment, the shaft extends through a self tapped hole in the bar. In another embodiment, a nut can be placed adjacent to the bar and used to secure the threaded shaft in its desired place. Undesired rotation of the threaded shaft is further hindered by the self tapped engagement of the shaft with the resilient material of the track.

Finally, the stud is typically mounted so as to pass directly through the reinforcing bar. Even though the track itself is resilient, this region of the track is not free to deflect upwardly in response to the reaction force experienced by the stud as it penetrates the ice. Thus, substantially the entire weight of the snowmobile presses the stud into engagement with the ice and the reinforcing bar is strong enough to overcome the reaction forces generated against the stud by the ice, thereby resulting in greater penetration of the stud into the ice.

Detailed Description of the Preferred Embodiments

Figure 1:
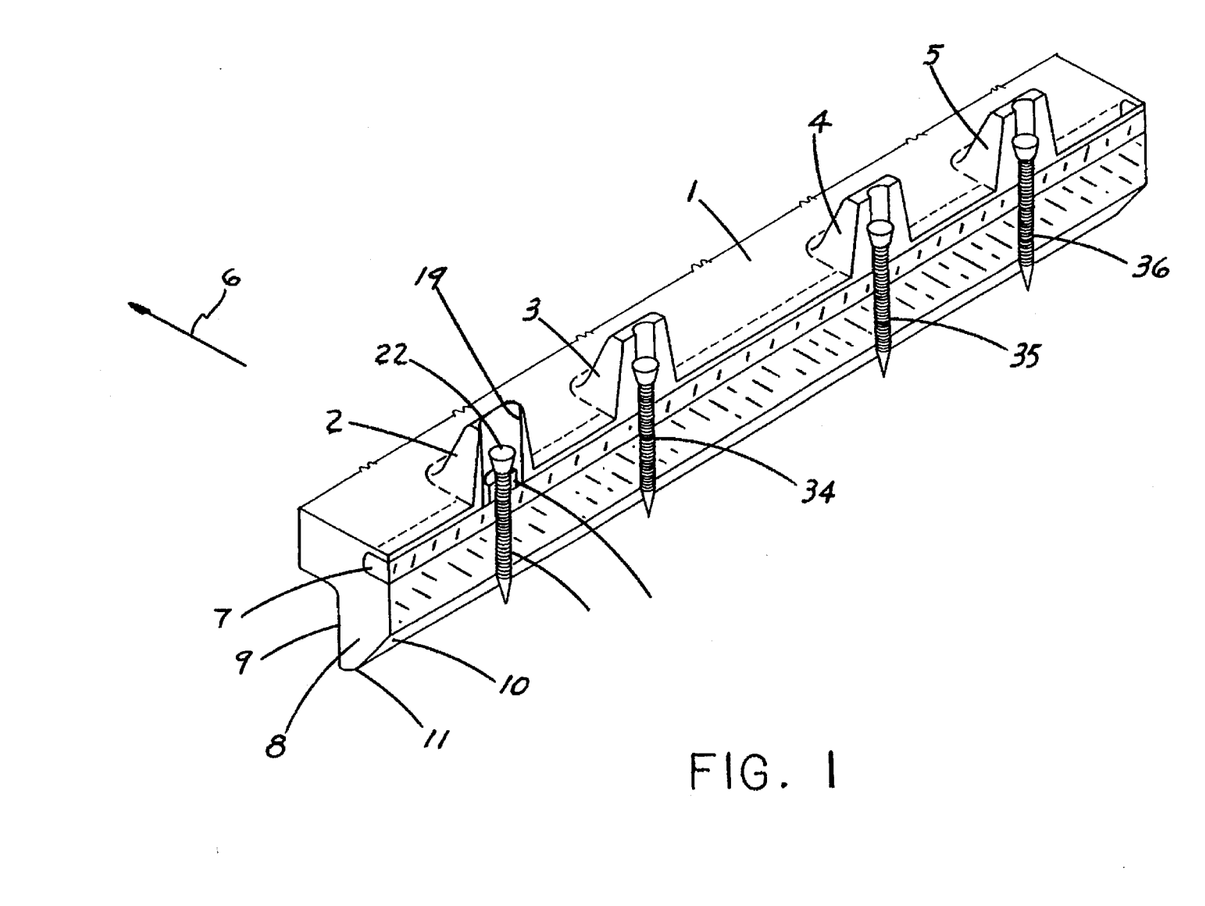
FIG. 1 is a perspective, cut away view of a resilient track showing the installation of an adjustable stud constructed according to the principles of the present invention.

Referring to FIG. 1, a typical snowmobile track 1 is seen to include a series of raised projections 2, 3, 4 and 5. Depending on the particular type of vehicle with which the track 1 is used, the projections 2–5 may instead take the form of a continuous ridge extending across the entire width of the track. Also, there may be more or fewer than the four ridges depicted here. In any event, the projections 2–5 engage some portion of the snowmobile drive mechanism (not shown) and in that manner the track 1 is caused to move generally in the direction of arrow 6. The track 1 is typically constructed or formed of a resilient, rubber like material.

Extending laterally across substantially the entire width of the track 1 is a rigid rod or bar 7. The bar is typically formed of a lightweight, stiff material, such as fiberglass, aluminum or a composite material and is formed integrally with the track at the time of the track's manufacture. Also extending for substantially the entire width of the track 1 is a bottom projection 8, which is formed integrally as a part of the track and is formed of the same material as the track 1. The projection 8 is formed to include a substantially vertical rear wall 9 and either an inclined or short vertical front wall 10, which are joined at their lower extremity to form foot 11. Some tracks (not shown) are also formed with raised projections that are not further reinforced by a laterally extending bar, and in some types of track construction the reinforcing bar does not extend across the entire width of the track. The present invention may be advantageously used with both of the latter types of track construction.

The installation of the present invention in a track 1 as just described can be understood by inspection of any of the preferred embodiments of the present invention as depicted in FIGS. 3 through 10. The stud 12 includes a tapered head 13 having a circular top surface 14. Formed within the head 13 is a hexagonal indentation 15, suitable for engagement by an allen wrench (not shown). The head has a length of approximately 0.1 to 0.2 inches. The lower plane 16 of the head 13 joins the threaded cylinder 17 which forms the body of the stud 12. The length of the threaded cylinder 17 is typically one to two inches, and has a nominal diameter of 0.1 to 0.2 inches. The length of the stud theoretically should be as long as possible given physical constraints of the track, insofar as the stud 12 will be resharpened many times during its useful life, and will, even without resharpening continue to shrink in length due to wear. A longer stud can be extended a greater number of times to compensate for such wear, and hence will have a longer service life.

Figure 2:
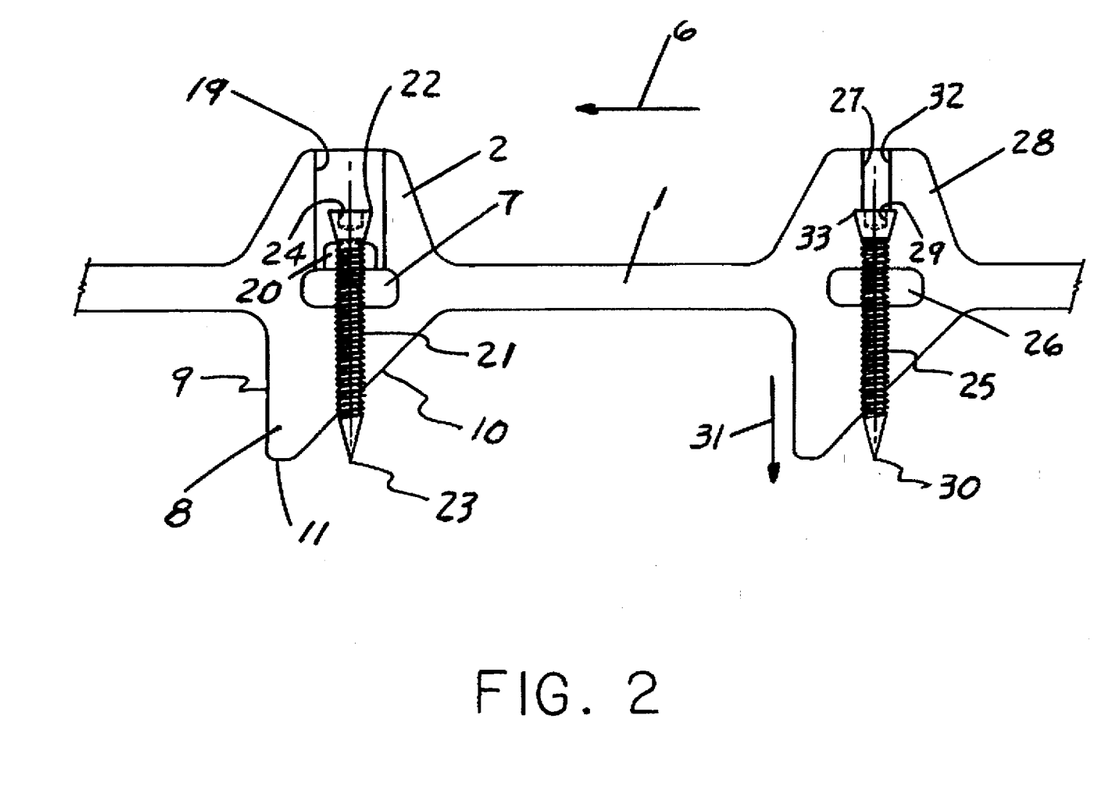
FIG. 2 is a side view of the resilient track as depicted in FIG. 1.

At the end of the cylinder 17 opposite the head 13 is formed, as just alluded to, a tapered point or carbide tip 18, which is typically 0.3 to 0.4 inches in length. The entire stud 12 is preferably formed of a strong, rigid material such as steel. FIG. 2 depicts features of the actual installation of the stud 12. In one method, a bore 19 is drilled into the raised region 2. The diameter of the bore 19 should be somewhat greater than the width of the nut 20 which is inserted into the bore 19. The nut 20 is placed onto the threaded shaft 21 and rotated toward the head 22 until it reaches a point that is approximately equal to its anticipated final position. A hole of a diameter of approximately 0.15 inches is drilled through the bar 7.

The shaft 21 and nut 20 assembly is inserted into the bore 19 and the pointed end 23 is inserted into the 0.15 inch hole previously drilled into the bar 7. An allen wrench is placed with the indentation 24 in head 22, and the head is rotated. The rotation of head 22 causes the threaded shaft 21 to advance into and through the bar 7, thereby tapping the 0.15 inch hole already formed within the bar 7. The shaft 21 is rotated until the end 23 protrudes beyond the surface 10 by the desired amount.

In most cases the stud 21 will be adjusted so that it protrudes to some degree from the bottom surface 10 or 11 of the track at all times. Further adjustment may be made after the tip 18 has been sharpened to restore the original degree of protrusion. Sharpening of tip 18 may be accomplished with the stud 12 either removed from or inserted into the track 1. Depending on the track dimensions, bar thickness and the amount of tip protrusion desired, the stud may be relatively much longer than the stud 21 depicted in FIG. 2. The stud 21 as illustrated would be most appropriate for situations where the track will be primarily used on snow, and the stud will therefore be fully retracted such that tip 23 does not extend beyond surface 10 for most situations. In those situations where mostly ice is expected, the stud 21 can be fully extended as shown, or the stud may be used in any combination of the described methods.

An alternate method of installation of a stud can also be seen by referring to FIGS. 1 and 2. The stud 25 is substantially identical in construction to the stud 21 just described. However, the stud 25 is installed through bar 26 without the use of a nut. Instead, a bore 27 is drilled into raised region 28 and through bar 26 that has a diameter that is substantially equal to the diameter of the shaft 25. This prevents damage to the bar 26 as the shaft 25 is advanced through bar 26. The stud 25 is then inserted into the bore 27 and rotated by means of an allen wrench inserted into indentation 29. The rotation of the shaft 25 advances the tip 30 in the direction of arrow 31, and results in the wall 32 of bore 27 being tapped as the stud is advanced. The greatest diameter of the head 33 is significantly greater than the diameter of the bore 27. However, due to the resilient nature of the track 1 material, the head 33 is able to advance into the bore 27 by deforming the walls of the bore. The pressure exerted by the resilient track 1 material is sufficient in many cases to rigidly restrain the stud 25 from unwanted movement during use. Each of the studs 34, 35, and 36 depicted in FIG. 1 has been installed in the manner just described.

Figure 3:
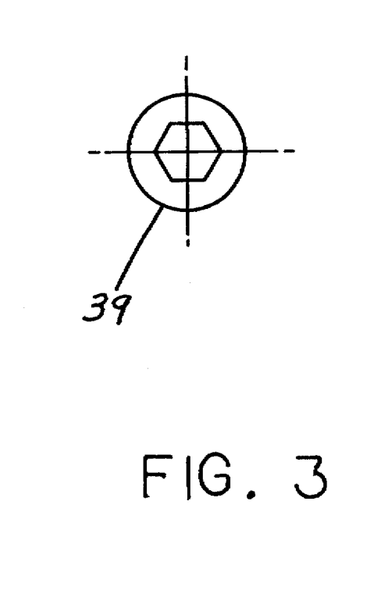
FIG. 3 is a top plan view of a first embodiment of a stud constructed according to the principles of the present invention.
Figure 4:
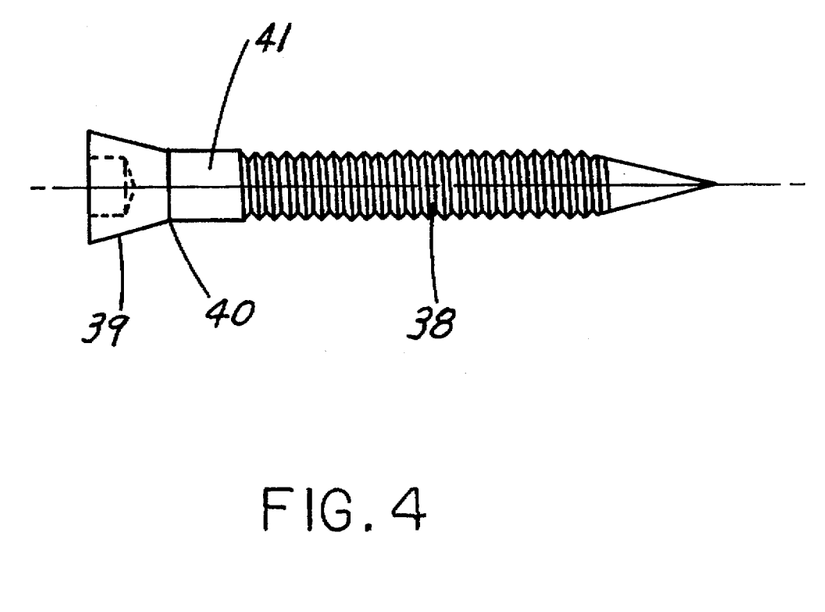
FIG. 4 is a side elevational view of the stud depicted in FIG. 3.
Figure 5:
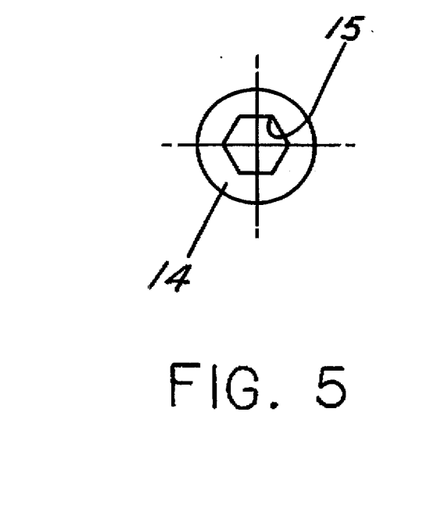
FIG. 5 is a top plan view of a second embodiment of a stud constructed according to the principles of the present invention.
Figure 6:
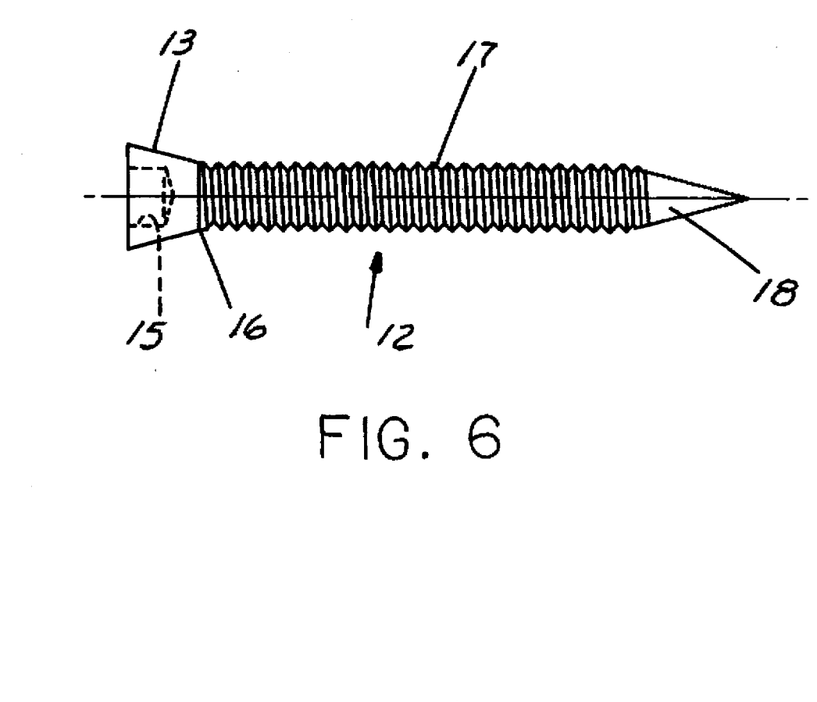
FIG. 6 is a side elevational view of the stud depicted in FIG. 5.

The stud itself can be advantageously modified, as seen in FIGS. 3 and 4. In this case, the stud 38 is formed to include a tapered head 39 having a diameter of approximately 0.3 to 0.4 inches. The base 40 of head 39 joins an unthreaded region 41 which extends approximately 0.2 to 0.3 inches before joining the threaded portion of the stud 38. This construction is suitable for both types of installations just described, especially when the height of raised regions 2–5 is relatively great. All of the studs described herein have a self tapping thread such as a 3/16–24 National Coarse, for example, although any size stud and thread may be used depending on the ruggedness required in a particular application. An optimum length of the stud, providing the requisite stiffness and degree of adjustability, is approximately one to two inches.

Figure 7:
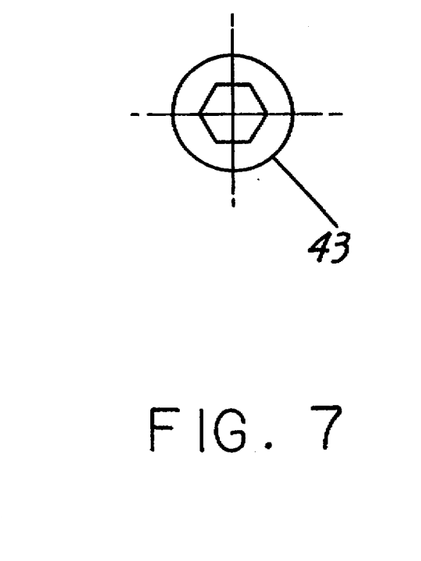
FIG. 7 is a top plan view of a third embodiment of a stud constructed according to the principles of the present invention.
Figure 8:
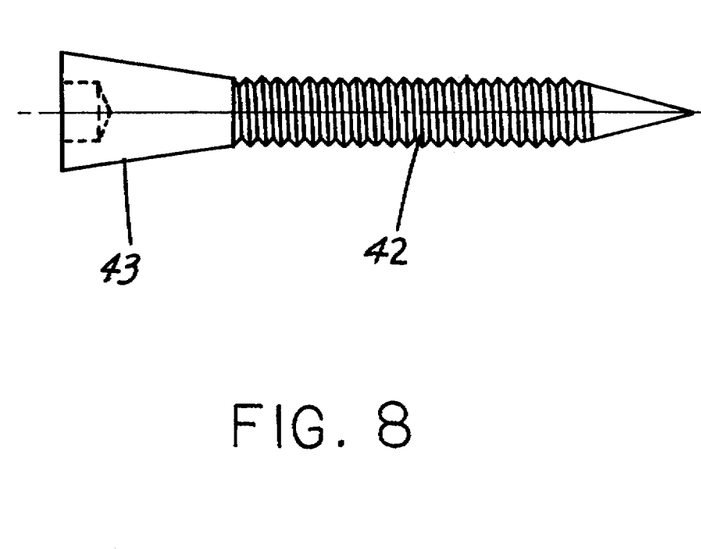
FIG. 8 is a side elevational view of the stud depicted in FIG. 7.

Referring to FIGS. 7 and 8, a third embodiment of the present invention can be understood. The stud 42 is formed to include a head 43 having an angle of taper of approximately sixteen degrees, or half that of the two previous embodiments. The length of the head is also significantly greater, being approximately 0.459 inches. This form of construction is preferred for installation without a nut, since the shallower, longer taper will be more readily advanced through the undersized bore.

Figure 9:
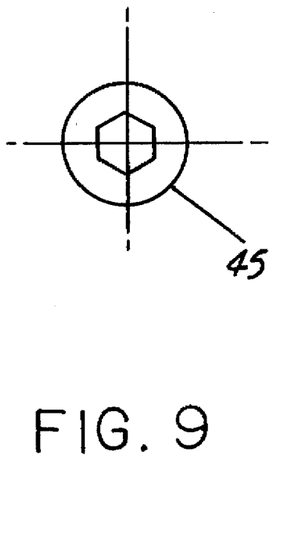
FIG. 9 is a top plan view of a fourth embodiment of a stud constructed according to the principles of the present invention.
Figure 10:
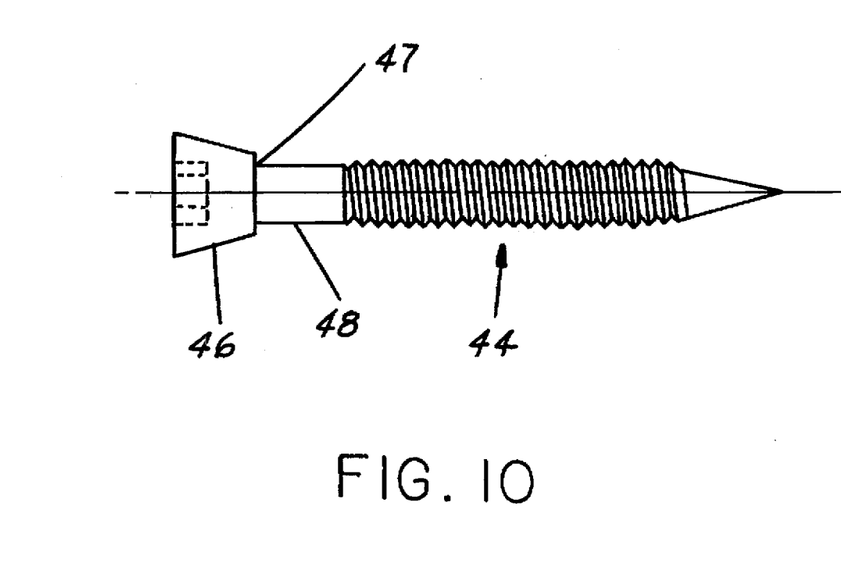
FIG. 10 is a side elevational view of the stud depicted in FIG. 9.
Figure 11:
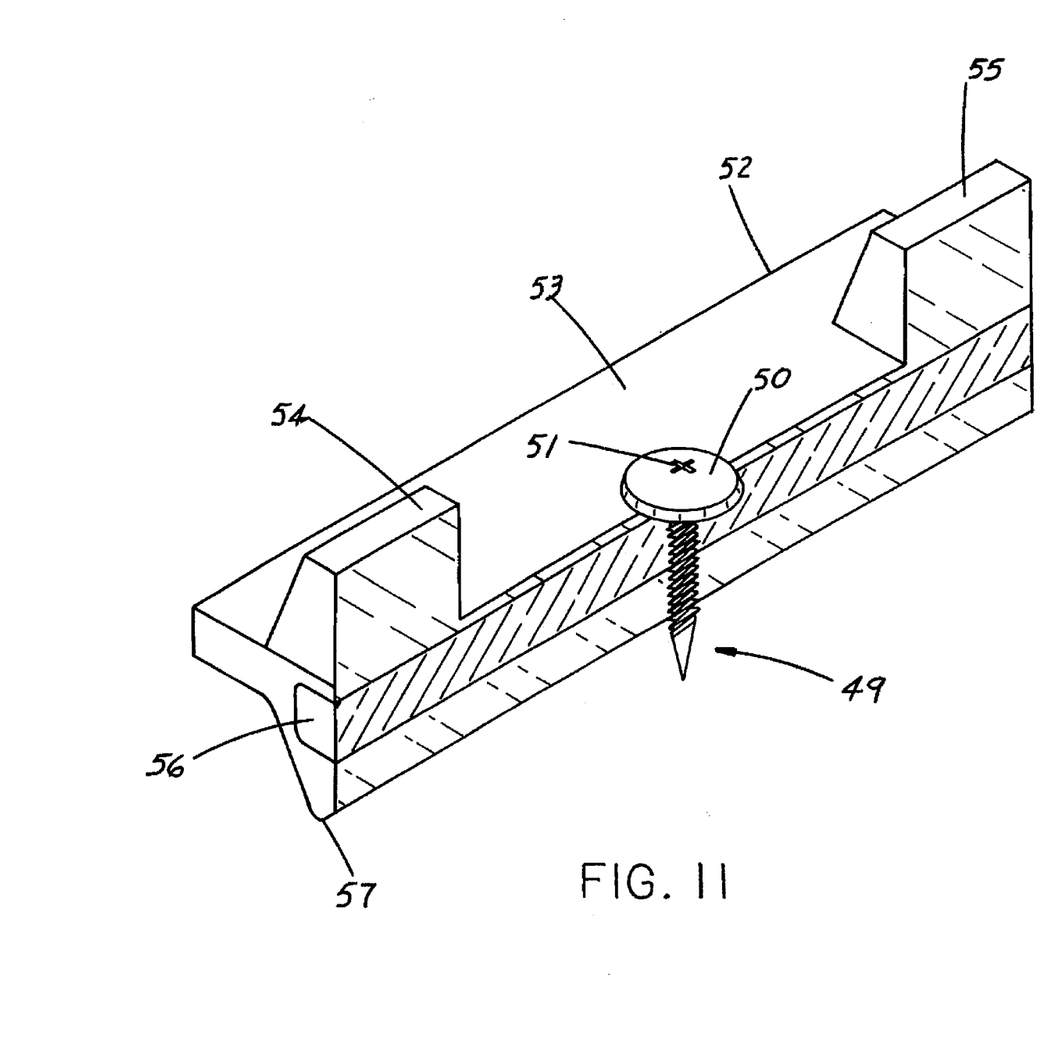
FIG. 11 is an isometric sectional view of an alternate stud and installation scheme embodying the principles of the present invention.

A fourth embodiment of the stud is shown in FIGS. 9 and 10, which depicts a stud 44 having an enlarged head 45. The head 45 is formed to include tapered sidewalls 46 which terminate at shoulder 47. The shoulder 47 is approximately orthogonal to the shaft 48 of stud 44. As seen in FIG. 11, a stud 49 can be formed with a relatively flat head 50 having a phillips head (or other slotted arrangement) indentation 51 formed within head 50. The stud 49 is installed in track 52 in a relatively planar region 53 residing between the raised areas 54 and 55, for example. The reinforcing bar 56 is penetrated by stud 49 and protudes through the bottom surface 57 of track 52. Note that this installation is accomplished without the use of a nut. The stud 49 design must be constructed so as to be available in different lengths as it typically is not used as an adjustable length stud, but rather the head 50 is mounted so as to be substantially flush with the inside of the track. These are, of course, the commercial embodiments of an invention which can be modified in a variety of ways and still be within the scope of the claims.

I claim:

1. A method of installing an adjustable height ice stud in a flexible snowmobile track, the flexible track being formed to include at least one internal laterally extending track stiffening member, the flexible track being formed to include a raised region adjacent to the laterally extending track stiffening member, comprising the steps of:

a. drilling a first hole within the raised region of the track overlying the track stiffening member, the hole having a first diameter;

b. rotatably inserting the ice stud within the hole; and c. continuing rotation of the ice stud so as to pierce and tap the stiffening member and rigidly affix the ice stud to the stiffening member.

2. The method of claim 1, further comprising the step of drilling the first hole so as to have a first diameter that is less than a widest diameter of a threaded region of the ice stud.

3. The method of claim 1, further comprising the step of drilling a second hole that is coaxial with the first hole so as to enlarge the first hole, thereby creating a second diameter that is greater than a widest diameter of the ice stud so as to accommodate placement of a nut on the ice stud.

* * * * *